United States Patent [19]

Gosz

[11] Patent Number: 5,064,710
[45] Date of Patent: Nov. 12, 1991

[54] FIRE RETARDANT COMPOSITION

[76] Inventor: William G. Gosz, 70 Ash St., Hopkinton, Mass. 01748

[21] Appl. No.: 447,621

[22] Filed: Dec. 8, 1989

[51] Int. Cl.$^5$ .................. B32B 3/28; C09K 21/00
[52] U.S. Cl. .................... 428/182; 428/337; 428/537.1; 428/537.5; 428/921; 106/18.14; 106/18.15; 252/601; 252/607; 524/145; 524/416
[58] Field of Search ............. 106/18.17, 18.15, 18.14, 106/18.16, 18.19; 252/8.05, 3, 356, 606, 607, 601; 524/145, 146; 428/182, 337, 537.1, 537.5, 920, 921

[56] References Cited

U.S. PATENT DOCUMENTS

| 2,386,471 | 2/1942 | Jones et al. | 106/18.15 |
| 3,247,134 | 7/1962 | Hwa et al. | 524/145 |
| 3,644,597 | 2/1972 | Endler | 106/18.18 |
| 3,883,463 | 5/1975 | Jin et al. | 106/18.18 |
| 3,900,327 | 8/1975 | Miller | 106/18.17 |
| 3,955,987 | 5/1976 | Schaar et al. | 106/18.15 |
| 4,049,556 | 9/1977 | Tujimoto et al. | 252/8.05 |
| 4,383,858 | 5/1983 | Wagner | 106/18.14 |
| 4,447,336 | 5/1984 | Vandersall | 106/18.17 |
| 4,588,510 | 5/1986 | Salyer et al. | 252/3 |

OTHER PUBLICATIONS

Chemical Abstracts-JP 50000693 (1/7/75), "Aqueous Ammonium Polyphosphate Soln. as Fire Ext. or Fireproofing Agent".

Primary Examiner—William R. Dixon, Jr.
Assistant Examiner—Paul Marcantoni

[57] ABSTRACT

A fire retardant composition comprises an aqueous solution of at least one ammonium phosphate, an alkyl acid phosphate having from two to four carbon atoms, and a glycol having from two to four carbon atoms. The fire retardant composition is effective for treating thin cellulosic substrates, such as paper, plywood and fiberboard.

17 Claims, No Drawings

FIRE RETARDANT COMPOSITION

BACKGROUND OF THE INVENTION

This invention relates to a fire retardant composition for use in treating cellulosic materials such as paper, wood and fiberboard. The fire retardant composition of this invention is highly effective, penetrates rapidly into the cellulosic material, is environmentally safe, and can be easily manufactured without the use of toxic materials or complex chemical reactions.

Residential and commercial fires annually claim the lives of hundreds of people and cause millions of dollars in property damage. As a result, increased attention has focused on methods for eliminating or reducing the risk of fire by increasing the use of detection methods and extinguishing systems, such as sprinkler systems, and by substituting fire retardant materials for combustible materials whenever possible. Although fire retardant materials, are somewhat more expensive than equivalent combustible materials, there use in high risk environments is becoming increasingly popular since this approach avoids many of the problems associated with active fire retardant systems, such as maintenance and operational difficulties. In effect, passive fire retardant systems have been found to be more cost effective than active systems in the long run since they do not require monitoring and are essentially foolproof One problem associated with fire retardant materials is that they tend to have poorer physical properties and to be less aesthetically attractive than comparable materials which have not been treated for fire retardancy. Some fire retardant treatments tend to produce unsightly deposits on the surface of the treated cellulosic substrate, while others leave an undesirable film or residue. Still other fire retardant treatments involve the application of an intumescent paint to the substrate, which is an unsatisfactory approach for flexible substrates, and is also generally objectionable due to the charged appearance of the treated material. In addition, the fire retardant treatment may result in a loss of strength in the treated material which can be a serious disadvantage for some substrates such as fiberboard.

Another problem relates to the environmental safety of the fire retardant material and its components. Many of the organic materials which are used to manufacture fire retardants are complex brominated or chlorinated chemicals. These complex organics are not only unsafe to handle, but can also emit toxic fumes in the presence of a source of ignition. Toxic fumes are frequently more dangerous to humans than the fire which would result in the absence of the fire retardant treatment. Consequently, not only should the fire retardant reduce substantially the flammability of the substrate, but the substrate should also be safe to human occupants during flaming conditions.

Various fire retardant treatments for cellulosics have been proposed with varying degrees of success. U.S. Pat. Nos. 3,900,327 and 4,383,858 disclose flame retardants prepared by reacting, in different proportions, aqueous orthophosphoric acid and an alkylene oxide, preferably ethylene oxide or propylene oxide. This fire retardant is water-based, and is said to penetrate rapidly into the cellulosic substrate with only slight migration of phosphate salts to the surface of the substrate in highly humid atmospheres. However, alkylene oxides such as ethylene oxide and propylene oxide are highly toxic and potential carcinogens, and thus require extremely careful handling during the preparation of the fire retardant. Residues of the alkylene oxide may also remain in the finished fire retardant and the treated substrate, thus posing a further hazard to those who subsequently come in contact with these materials.

SUMMARY OF THE INVENTION

An improved fire retardant composition comprises an aqueous solution of at least one ammonium phosphate, preferably an aqueous mixture of ammonium phosphates, an alkyl acid phosphate having from two to four carbon atoms, preferably butyl acid phosphate, and a glycol having from two to four carbon atoms, preferably propylene glycol. This composition is particularly useful for treating cellulosic materials in order to render the materials fire resistant. Suitable cellulosic materials are lignin-containing cellulosic materials such as wood, particle board, paper, paperboard and fiberboard It is particularly advantageous to treat relatively thin substrates such as those having a thickness of about ¼" or less. The fire retardant of the present invention is able to penetrate relatively rapidly into the thin substrate and be retained by the substrate, thus providing a high degree of fire retardancy. Substrates such as thin veneer plywood, single and double wall corrugated fiberboard, and cellulosic cushioning material are preferred, and are readily to be treated by the fire retardant of this invention using a variety of high speed commercial treating equipment. Retention of the fire retardant in the substrate can be promoted through the use of chemical retention aids, polymer coatings or sizing agents.

The fire retardant composition is prepared from an aqueous solution of at least one ammonium phosphate. Aqueous solutions of monoammonium phosphate and diammonium phosphate are preferred, as are aqueous solutions of pyrophosphates. Such solutions typically have optimized concentrations of soluble phosphorus-containing components, and therefore can impart maximum fire retardancy to the cellulosic substrate.

100 parts by weight of the aqueous phosphate solution is admixed with 2 parts by weight of butyl acid phosphate, and the resulting solution is thoroughly admixed with an additional 2 parts by weight of propylene glycol to form a clear solution, preferably having a phosphorus content of at least about 7.5%.

The flammable substrate is then treated with sufficient fire retardant solution to substantially reduce its flammability. Normally, it would be desirable to achieve a surface flame spread index of 25 or less, i.e., Class I, and a smoke density or specific optical density of 100 or less, all after exposure to highly humid conditions. This is accomplished by coating the substrate with approximately 0.05 lbs to 0.15 lbs o fire retardant per square foot of substrate surface. Lighter substrates generally require less fire retardant than heavier substrates, and flat substrates are advantageously treated on both surfaces to achieve enhanced fire retardancy compared to substrates treated on only one surface. Application of the fire retardant to the substrate requires only a few seconds since the fire retardant is able to penetrate rapidly into the substrate and to a greater depth than conventional fire retardants. The treated substrate can then be dried, using conventional drying equipment, and further processed in accordance with commercial requirements.

DESCRIPTION OF THE PREFERRED EMBODIMENTS

The fire retardant composition of this invention is prepared by first formulating the aqueous ammonium phosphate solution. Such aqueous phosphate solutions are conventional in this art and can be prepared, for instance, by dissolving granular monoammonium phosphate or diammonium phosphate in water. Since the solubility of mixtures of monoammonium and diammonium phosphate is greater than either of the individual components, it is preferred to use such mixtures in this invention. In particular, a mixture of 50% monoammonium phosphate and 50% diammonium phosphate has a high solubility in water, thereby producing a solution with a phosphorous content of from about 7.5% to about 15% and an ammonium phosphate content of from about 25% to about 50% by weight. The ammonium phosphate solution will not by itself readily penetrate into the cellulosic substrate and must, therefore, be combined with additional ingredients to achieve satisfactory fire retardancy.

A small amount of an alkyl acid phosphate having from 2 to 4 carbon atoms, such as ethyl acid phosphate, propyl acid phosphate and butyl acid phosphate, is added to and mixed with the phosphate solution. Amounts of from about 1% to about 5% by weight are suitable, with about 2% by weight being preferred. Alkyl acid phosphates of this type are well known in the art, and can be prepared by reacting phosphorous pentoxide with ethyl alcohol, propyl alcohol or butyl alcohol, in appropriate proportions. Butyl acid phosphate has been found to be the most efficient and effective additive in terms of the penetrating ability of the fire retardant, and is thus preferred in the practice of this invention. Surprisingly, butyl acid phosphate is known to be insoluble in water and therefore it is surprising and unexpected that butyl acid phosphate is soluble in the aqueous ammonium phosphate solution.

The final component of the fire retardant composition is a glycol having from two to four carbon atoms, such as ethylene glycol, propylene glycol and butylene glycol. Propylene glycol is preferred. The glycol is added to and mixed with the mixture of aqueous ammonium phosphate solution and alkyl acid phosphate in an amount of up to about 5% by weight, preferably from about 1% to about 5% by weight, and most preferably about 2% by weight. The resulting solution has a pH in the range of 6.0 to 7.0 and is visually clear.

The fire retardant composition can be applied to the cellulosic substrate using well known application techniques such as by spraying, roller coating, flooding, etc. The fire retardant is absorbed rapidly into the cellulosic substrate, typically in a matter of only a few seconds.

The cellulosic substrate can be paper, wood, veneer, plywood, composite board, paperboard, particle board and fiberboard including single and double wall corrugated varieties. Maximum fire resistance is achieved with relatively thin substrates, and particularly substrates having a thickness of ½" or less and preferably less than ¼", by means of ordinary application techniques which do not require the use of pressure. The fire retardant solution can be applied to either one side of the substrate or both sides at an application rate of from about 0.05 lbs to about 0.15 lbs per square foot of material surface.

Following treatment with the fire retardant, the substrate is dried using conventional drying techniques such as infrared heat lamps, forced air driers, etc. The substrate can also be treated with other treating materials such as sizing agents, wax or polymer coatings, binders or the like.

Fire retardant materials prepared in accordance with the present invention have been found to exhibit excellent fire resistant characteristics without a diminution in physical properties. In particular, the treated cellulosic materials of this invention exhibit a surface flame spread of less than about 20, when evaluated according to ASTM E 162, and an optical smoke density of less than 100 in both flaming and non-flaming modes, when evaluated in accordance with ASTM E 662.

The following example further illustrates a preferred embodiment of this invention. This example is provided for illustrative purposes only, and is not meant to limit the invention as more fully set forth in the appended claims and foregoing description.

EXAMPLE

A fire retardant composition was prepared by adding 4 parts by weight of water to 1 part by weight of monoammonium phosphate and 1 part by weight of diammonium phosphate, and stirring the resulting mixture until most of the phosphate crystals had dissolved. The mixture was left standing overnight to dissolve the remaining crystals. To this mixture was added 2% by weight of butyl acid phosphate with stirring, followed by 2% by weight of propylene glycol also with stirring The resulting clear solution had a pH of about 6.0.

Six (6) pieces each of single wall and double wall corrugated fiberboard sheets were evenly coated on both sides with the fire retardant solution using a brush. Each sheet measured 6" by 18" and approximately 12 grams of fire retardant solution was applied to each side of each sheet. The fire retardant was observed to penetrate rapidly into the fiberboard. Surprisingly, the fiberboard did not become "unglued" during treatment even though the fire retardant penetrated to the glue line between the liner board and the corrugating medium.

The treated sheets were allowed to dry overnight. After 24 hours of air drying, the sheets were examined and found to be dry. The sheets were flexed and found to have retained their original strength.

The treated sheets were examined for flame spread using ASTM E 162 for measuring surface flammability using a radiant energy heat source. Prior to testing, the materials were exposed to 90° F. and 95% relative humidity for seven days and dried to constant weight. The sheets were found to have an average flame spread of 11. This compares to a flame spread for untreated sheets of over 100.

The sheets were also subjected to smoke density testing in both the flaming and non-flaming modes according to ASTM E 662 and found to have an average optical smoke density of 48. In comparison, the optical smoke density of untreated sheets exceeds 100.

What is claimed is:

1. A liquid fire retardant composition for treating cellulosic material consisting essentially of aqueous solution of from about 25% to about 50% by weight of at least one ammonium phosphate, from about 1% to about 5% by weight of an alkyl acid phosphate having from two to four carbon atoms, and up to about 5% by weight of a glycol having two to four carbon atoms.

2. The composition of claim 1 wherein the alkyl acid phosphate is butyl acid phosphate and the glycol is propylene glycol.

3. The composition of claim 2 wherein the butyl acid phosphate is present in the solution in an amount of about 2% by weight and the propylene glycol is present in an amount of about 2% by weight.

4. The composition of claim 1 wherein the ammonium phosphate is a mixture of diammonium phosphate and monoammonium phosphate.

5. The composition of claim 4 wherein the diammonium phosphate and monoammonium phosphate are present in the solution in approximately equal amounts by weight.

6. The composition of claim 1 wherein the cellulosic material is wood, plywood on a composite wood product.

7. The composition of claim 1 wherein the cellulosic material is paper, paperboard or fiberboard.

8. The composition of claim 7 wherein the cellulosic material is a corrugated fiberboard material.

9. A process for preparing a fire retardant composition consisting essentially of the steps of:
   a) formulating an aqueous ammonium phosphate solution
   b) adding from about 1% to about 5% by weight of an alkyl acid phosphate having from 2 to 4 carbon atoms to the ammonium phosphate solution and mixing thoroughly and
   c) adding up to about 5% by weight of a glycol having from 2 to 4 carbon atoms to the mixture of step (b) an mixing thoroughly.

10. The process of claim 9 wherein the aqueous ammonium phosphate solution has a phosphorous content of from about 7.5% to about 15%.

11. The process of claim 10 wherein the alkyl acid phosphate is butyl acid phosphate and the glycol is propylene glycol.

12. The process of claim 11 wherein the butyl acid phosphate is added in an amount of about 2% by weight and the propylene glycol is added in an amount of about 2% by weight.

13. A process for treating a cellulosic material to render said material fire retardant, said process comprising the steps of:
   a) applying the composition of claim 1 to at least one surface of said cellulosic material in an amount of from about 0.05 lbs to about 0.15 lbs per square foot of material surface, and
   b) drying the substrate to remove excess water.

14. The process of claim 13 wherein the cellulosic material is selected from the group consisting of wood, paper, paperboard, and fiberboard.

15. The process of claim 14 wherein the cellulosic material is less than about ¼" thick.

16. The process of claim 13 wherein the cellulosic material is subsequently treated with a sizing agent.

17. A fire retardant cellulosic material which is prepared by the process of claim 13.

* * * * *